United States Patent [19]
Okano et al.

[11] Patent Number: 6,001,017
[45] Date of Patent: *Dec. 14, 1999

[54] GAME DEVICE FOR DISPLAYING GAME INPUT OPERATIONS ON THE DISPLAY

[75] Inventors: Tetsu Okano; Tadashi Kagawa, both of Tokyo, Japan

[73] Assignee: SEGA Enterprises, Ltd., Tokyo, Japan

[*] Notice: This patent is subject to a terminal disclaimer.

[21] Appl. No.: 08/778,349

[22] Filed: Jan. 3, 1997

Related U.S. Application Data

[62] Division of application No. 08/294,811, Aug. 25, 1994, Pat. No. 5,649,861.

[30] Foreign Application Priority Data

Aug. 25, 1993 [JP] Japan ..................................... 5-210219
Aug. 15, 1994 [JP] Japan ..................................... 6-191376

[51] Int. Cl.$^6$ ............................................................ A63F 9/22
[52] U.S. Cl. ................................. 463/43; 463/8; 463/31; 273/148 B
[58] Field of Search .................................. 463/8, 30, 31, 463/36, 37, 38, 39, 43, 44; 273/148 B; 345/156

[56] References Cited

U.S. PATENT DOCUMENTS 5,394,168  2/1995  Smith, III et al. ...................... 345/156

FOREIGN PATENT DOCUMENTS 5-44179  6/1993  Japan .

*Primary Examiner*—Michael O'Neill
*Attorney, Agent, or Firm*—Dickstein Shapiro Morin & Oshinsky LLP

[57] ABSTRACT

A game device comprises operational input means 30, 40 for inputting operational signals supplied by operation of game players, game control means 10 for controlling a game, based on the operational signals of the operational input means 30, 40, and game display means 20 for displaying the game controlled by the game control means 10, the operational signals of the operational input means 40 being displayed by the game display means 20. The game player can confirm game operations they made. As a result, the game player can relatively readily see their game operations they made without stress given to them.

7 Claims, 7 Drawing Sheets

GAME DEVICE FOR DISPLAYING GAME INPUT OPERATIONS ON THE DISPLAY

CROSS REFERENCE TO RELATED APPLICATIONS

This application is a Divisional of U.S. application Ser. No. 08/294,811, filed Aug. 25, 1994, now U.S. Pat. No. 5,649,861.

BACKGROUND OF THE INVENTION

The present invention relates to a game device comprising operational input means for inputting operational signals produced by operation of a player of a game, game control means for controlling the game, based on the operational signals of the operational input means, and game display means for displaying the game controlled by the game control means.

Game centers are popular as amusement facilities easily enjoyed at hand, and improved game devices come out one after another. Contents of games played on the game devices become increasingly sophisticated and complicated. As game contents become more sophisticated and complicated, operations by players are increasingly complicated. A considerably large number of the improved game devices use, for fancy, new operational input means.

As such sophisticated and complicated game contents of game devices require various operations, it is not easy for players to learn their game operations.

In a case that the contents of a game is so complicated that one motion requires a string of game operations, even when a player who has learned its operation is sure that he has made correct operations, sometimes the operations are actually incorrect, and characters do not move as he expects. This puts stress on the player.

Such conventional game devices find it difficult to satisfy players by simple game contents, while as game contents become more sophisticated and complicated, it is difficult for players to correctly learn various game operations and make perfect operations. This gives stress to the players, and this is a problem.

SUMMARY OF THE INVENTION

A first object of the present invention is to provide a game device which makes game players free from stress and makes them readily familiar with complicated game operations.

A second object of the present invention is to provide a method of displaying a game which makes readily familiar with complicated game operations.

The above-described first object is achieved by a game device comprising operational input means for inputting operational signals produced by operation of a player of a game, game control means for controlling the game, based on the operational signals of the operational input means, and game display means for displaying the game controlled by the game control means, the game control means including operational display means for displaying in the game display means the operational signals inputted by the operational input means.

In the above-described game device, it is preferable that the operational display means comprises display element storing means for storing a plurality of display elements for displaying a plurality of operational signals supplied by the operational input means, and display element selecting means for selecting a display element to be displayed among said plurality of display elements stored in the display element storing means, based on an operational signal supplied by the operational input means.

In the above-described game device, it is preferable that the operational input means includes a first operational input means to be operated by a first player of the game, and a second operational input means to be operated by a second player of the game, and the display element stores means storing first display elements for displaying a plurality of operational signals supplied by the first operational input means, and second display elements for displaying a plurality of operational signals supplied by the second operational input means.

In the above-described game device, it is preferable that the operational input means includes a plurality of operational buttons to be operated by the player, and said plurality of display elements are arranged corresponding to a layout of the operational buttons of the operational input means.

In the above-described game device, it is preferable that the operational input means includes an operational mat for the player to stand on, and a plurality of sensors arranged around the operational mat for detecting the arms and legs of the player extended thereabove to input operational signals in accordance with motions of the arms and legs of the player, and said plurality of display elements are arranged corresponding to an arrangement of said plurality of sensors of the operational input means.

In the above-described game device, it is preferable that said plurality of display elements are displayed at a set position on a display screen for displaying the game.

In the above-described game device, it is preferable that the first display elements are displayed at a first set position on the side of a display screen for displaying the game where the first display operational input means is positioned, and the second display elements are displayed at a second set position on the side of the display screen where the second display operational input means is positioned.

In the above-described game device, it is preferable that the player operates his own character in the game to play the game, and said plurality of display elements follow the moving of the character on a display screen for displaying the game.

In the above-described game device, it is preferable that the first player operates a first character in the game to play the game, the second player operates a second character in the game to play the game, said first display elements follow the moving of the first character on a display screen for displaying the game, and said second display elements follow the moving of the second character on the display screen.

In the above-described game device, it is preferable that said plurality of display elements are displayed on a barrel part of the character.

In the above-described game device, it is preferable that said first display elements are displayed on a barrel part of the first character, and said second display elements are displayed on a barrel part of the second character.

The above-described second object is achieved by a method of displaying a game controlled based on operational signals produced by operation of a player of the game, the method further displaying the operational signals on a display screen for displaying the game.

In the above-described method, it is preferable that a plurality of display elements are stored for displaying a plurality of operational signals, and a display element to be displayed is selected among said plurality of display elements, based on an operational signal produced by operation of the player of the game.

In the above-described method, it is preferable that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game.

In the above-described method, it is preferable that said plurality of display elements are arranged corresponding to a layout of a plurality of operational buttons which are operated by the player to inputt said plurality of operational signals.

In the above-described method, it is preferable that an operational mat is provided for the player to stand on, a plurality of sensors are arranged around the operational mat for detecting the arms and legs of the player extended thereabove to input operational signals in accordance with motions of the arms and legs of the player, and said plurality of display elements are arranged corresponding to an arrangement of said plurality of sensors.

In the above-described method, it is preferable that said plurality of display elements are displayed at a set position on a display screen for displaying the game.

In the above-described method, it is preferable that the player operates his own character in the game to play the game, and said plurality of display elements follow the moving of the character on a display screen for displaying the game.

In the above-described method, it is preferable that said plurality of display elements are displayed on a barrel part of the character.

According to the present invention, there is provided operational display means for displaying operational signals inputted by operation of operational input means by game player. The game player can confirm game operations they made. As a result, the game player can relatively readily see their game operations they made without stress given to them.

In the above-described game device, the operational display means includes display element storing means for storing a plurality of display elements indicative of a plurality of operational signals supplied by the operational input means, and display element selecting means for selecting a display element to be displayed among the plurality of display elements stored in the display element storing means, based on an operational signal supplied by the operational input means, whereby the operational signal inputted by the operation input means can be discriminatively confirmed.

In the above-described game device, there are provided as the operational input means, first operational input means which is operated by a first player of the game, and second operational input means which is operated by a second player of the game, and first display elements for displaying a plurality of operational signals supplied by the first operational input means, and second display elements for displaying a plurality of operational signals supplied by the second operational input means are stored by the element storing means, whereby the two operational input means can be discriminatively confirmed.

In the above-described game device, a plurality of display elements are arranged corresponding to an arrangement of operational buttons of the operational input means, whereby operational states of the operational input means can be readily seen.

In the above-described game device, in the case that the operational input means includes an operational mat for the player to stand on, and a plurality of sensors arranged around the operational mat for detecting the arms or legs of the player outwardly extended, the plural display elements are arranged corresponding to an arrangement of the plurality of sensors of the operational input means, whereby even if the operational input means is difficult to see operational states, operational signals can be seen without failure.

In the above-described game device, the plural display elements are set in position on the display screen for a game to be displayed, whereby operational states of the operational input means can be readily seen.

In the above-described game device, the first display elements are displayed at a first set position on the side of a display screen where the first operational input means is positioned, and the second display elements are displayed at a second set position on the side of the display screen where the second operational input means is positioned, whereby the two operational input means can be discriminatively confirmed.

In the above-described embodiment, in the case that the player operates his own character to play the game, a plurality of display elements follow the moving of the character on a display screen for displaying the game, whereby the game player only looks at motions of the character to readily see the operational signals he inputted. A plurality of display elements are displayed especially at a barrel part of the character, whereby the game player can very readily see his operational signals.

In the above-described game device, in the case that the first player operates a first character in the game to play the game, and that the second player operates a second character in the game to play the game, said first display elements follow the moving of the first character on a display screen for displaying the game, and said second display elements follow the moving of the second character on the display screen for displaying the game, whereby the first and second players only look at motions of the characters to readily see the operational signals. A plurality of display elements are displayed especially at a barrel part of the character, whereby the players can very readily see his operational signals.

According to the present invention, in a method of displaying a game controlled based on operational signals produced by operation of a player of the game, the operational signals are displayed on a display screen for displaying the game, whereby the player can readily see their game operations they made without stress given to them.

In the above-described method, a plurality of display elements are stored for displaying a plurality of operational signals, and a display element to be displayed is selected among said plurality of display elements, based on an operational signal produced by operation of the player of the game, whereby the operational signal inputted by the player can be discriminatively confirmed.

In the above-described method, in the case that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game, whereby the operations of the first player and the second player can be discriminatively confirmed.

In the above-described method, the plurality of display elements are arranged corresponding to a layout of a plurality of operational buttons which are operated by the player to input said plurality of operational signals, whereby the operational states of the operational buttons can be readily seen.

In the above-described method, in the case that an operational mat is provided for the player to stand on, and a plurality of sensors are arranged around the operational mat for detecting the arms and legs of the player extended thereabove to input operational signals in accordance with motions of the arms and legs of the player, the plurality of display elements are arranged corresponding to an arrangement of said plurality of sensors, whereby even if the operation is difficult to see operational states, operational signals can be seen without failure.

In the above-described method, the plurality of display elements are displayed at a set position on a display screen for displaying the game, whereby operational states of the player can be readily seen.

In the above-described method, in the case that the player operates his own character in the game to advance the game, the plurality of display elements follow the moving of the character on a display screen for displaying the game, whereby the player only looks at motions of the character to readily see the operational signals he inputted. A plurality of display elements are displayed especially at a barrel part of the character, whereby the players can very readily see his operational signals.

DETAILED DESCRIPTION OF THE INVENTION

The game device according to a first embodiment of the present invention will be explained with reference to FIGS. 1 to 3B.

Figure 1:
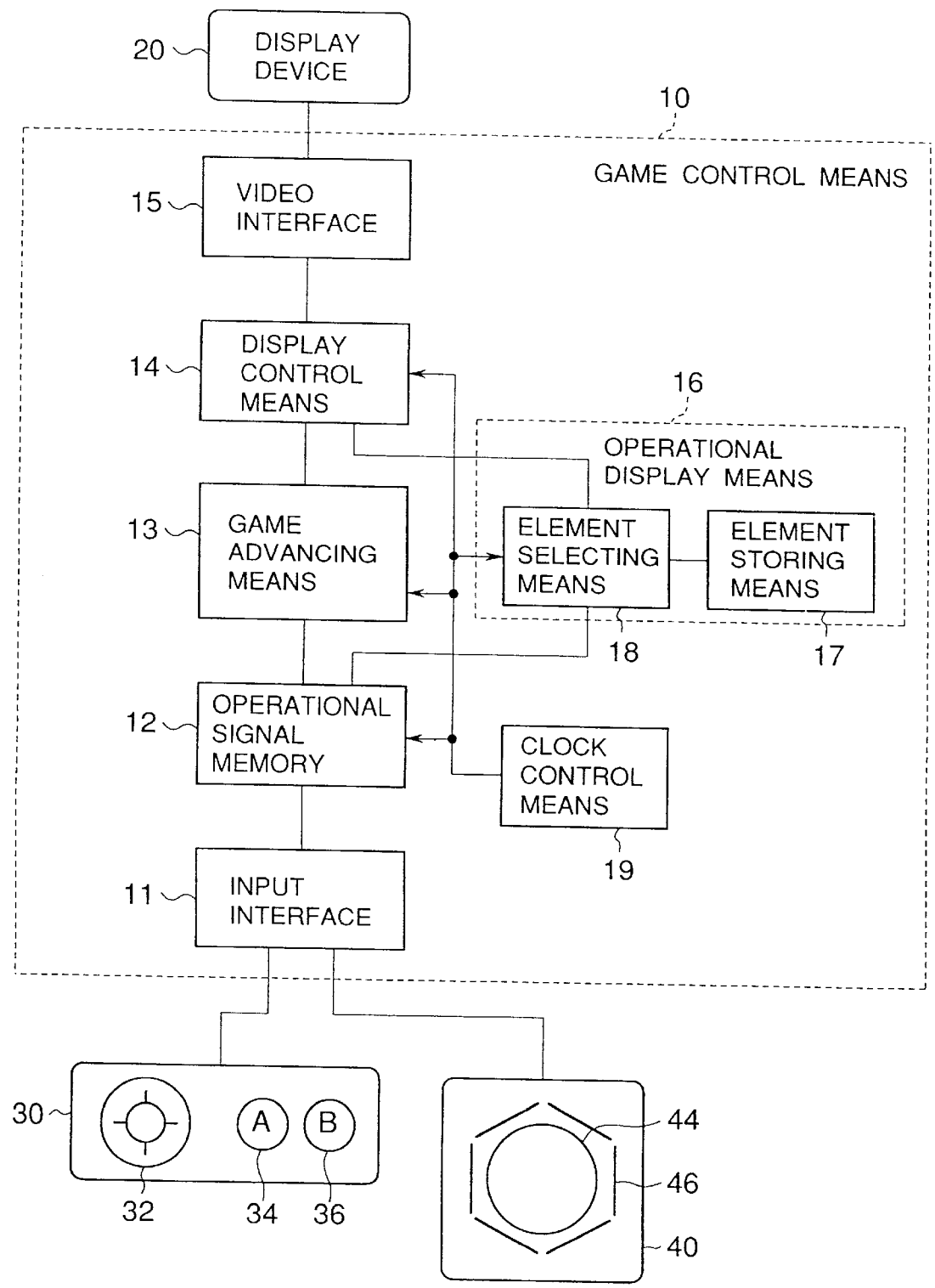
FIG. 1 is a block diagram of the game device according to a first embodiment of the present invention.

The game device according to the first embodiment, as shown in FIG. 1, comprises game control means 10 for controlling a game. The game control means 10 is connected to a display device 20 for displaying the game to be controlled. The game control means 10 is further connected to a conventional controller 30 as operational input means for inputting operational signals indicative of operations made by a game player, and a light harp 40 as innovational operational input means.

The controller 30 includes a joy stick 32 having four switching elements or buttons 32a to 32d for inputting signals indicative of operational directions, and an A button 34 and a B button 36 for inputting signals indicative of selected operations.

Figure 2:
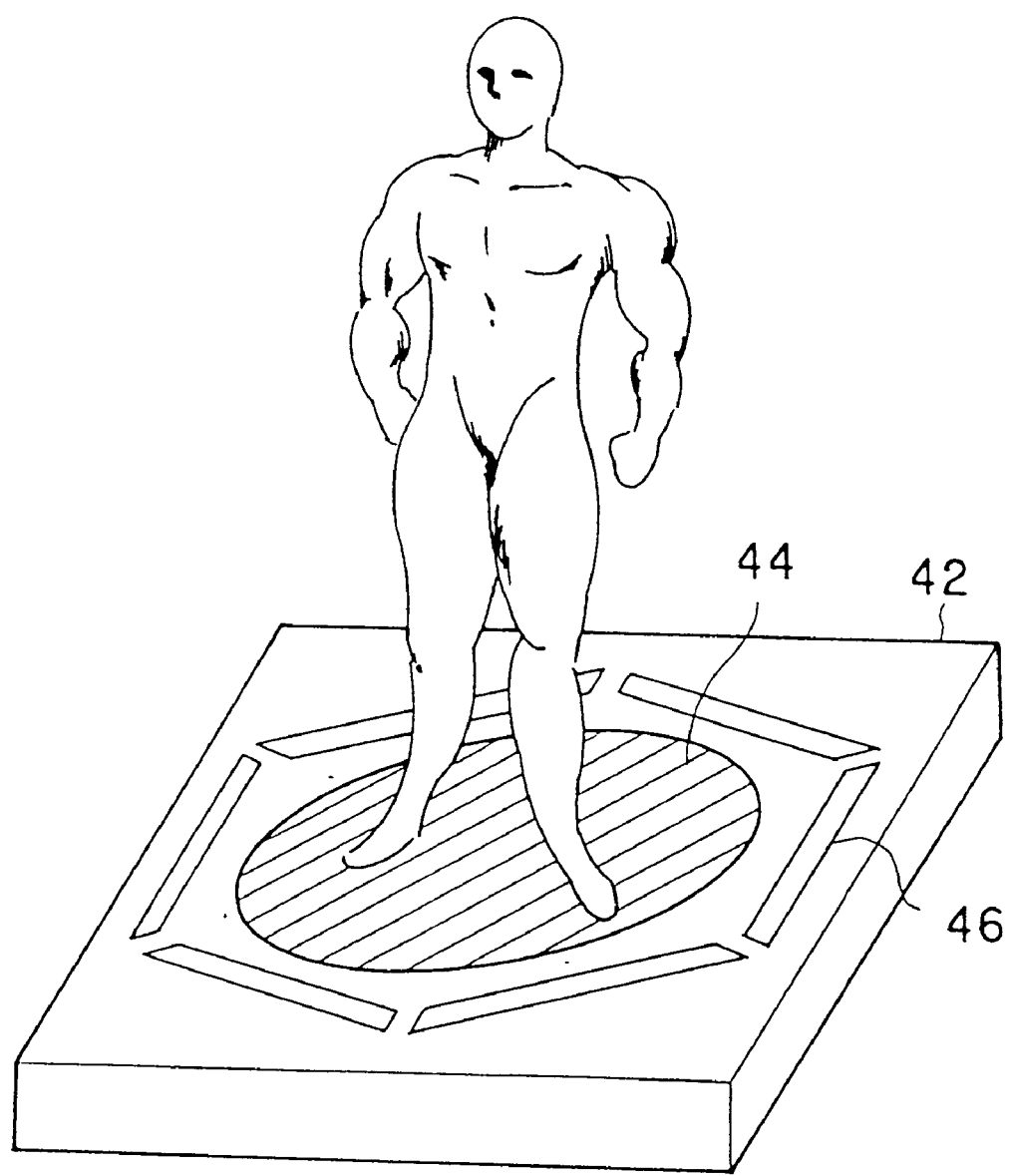
FIG. 2 is an explanatory view of the light harp used in the first embodiment of the present invention.

Differently from the conventional operational input means, such as a controller, etc., a game player bodily uses the light harp 40 to input signals thereto. As shown in FIG. 2, the eight harp 40 comprises an operational mat 44 provided at the center thereof for detecting presence of a game player thereon, and 6 infrared ray sensors 46 provided around the operational mat 44. A game player stands on the operational mat 44 and extends his arms and legs above the infrared ray sensors 46. The infrared ray lamps 46 detect block of the infrared rays by their reflection against the arms and the legs. The operational mat 44 is off while a game player is thereon and is turned on when the game player jumps on the operational mat 44. The light harp 40 works as switch elements responding to movement of the game player.

The game control means 10 is connected to operational input means, such as the controller 30 and the light harp 40, through an input interface 11. Operational signals from the operational input means are stored in an operational signal memory 12.

To advance a game based on a game program there is provided game advancing means 13. The game advancing means 13 advances the game in response to the operational signals stored in the operational signal memory 12 and outputs advancing states to the display control means 14.

The display control means 14 controls game displays to be displayed in accordance with advancing states of a game outputted by the game advancing means 13. Video display signals indicative of game displays are outputted to the video display device 20 through a video interface 15.

The game control means 10 includes operational display means 16 for displaying elements simulating input means, such as the controller 30, light harp 40 or the like on display monitor device 20.

Figure 5:
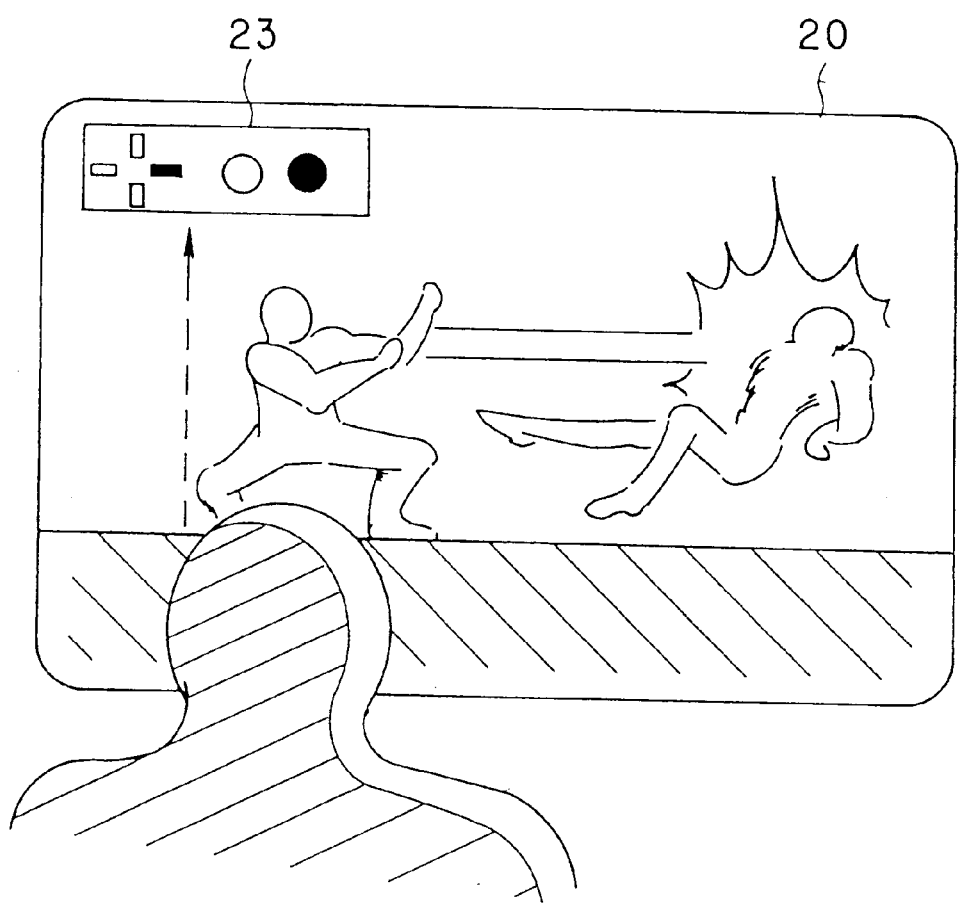
FIG. 5 is an explanatory view of a first display example of the game device according to the second embodiment of the present invention.

The operational display means 16 includes element storing means 17 for storing signal data for displaying a plurality of display elements, for example, 23a to 23f as shown in FIG. 5, simulating a plurality of switching elements, for example, 32a to 32d, 34 and 36 as shown in FIG. 1, of the operational input means, such as the controller 30, the light harp 40, etc., and element selecting means 18 for selecting a display element to be displayed among the plurality of display elements stored in the element storing means 17. A layout and shapes of a plurality of display elements are disposed so as to simulate the switching elements or buttons of the operational input means. Examples of the display elements will be described later.

The game control means 10 includes clock control means 19 for synchronization. Synchronization signals from the clock control means 19 are inputted to the operational signal memory 12, the game advancing means 13, the display control means 14 and the element selecting means 18.

The element selecting means 18 outputs from the element storing means 17 to the display control means 14, in synchronization with a start of a vertical blanking period for the video display, signals for displaying selected elements, for example, 23b and 23f in FIG. 5, or changing colors of the display elements 23d and 23f based on the operational signals stored in the operational signal memory 12. The selected elements are displayed on a video frame following the end of the vertical blanking period. Thus display control is conducted in response to the operational signals during a vertical blanking period for the video display.

Figure 3A:
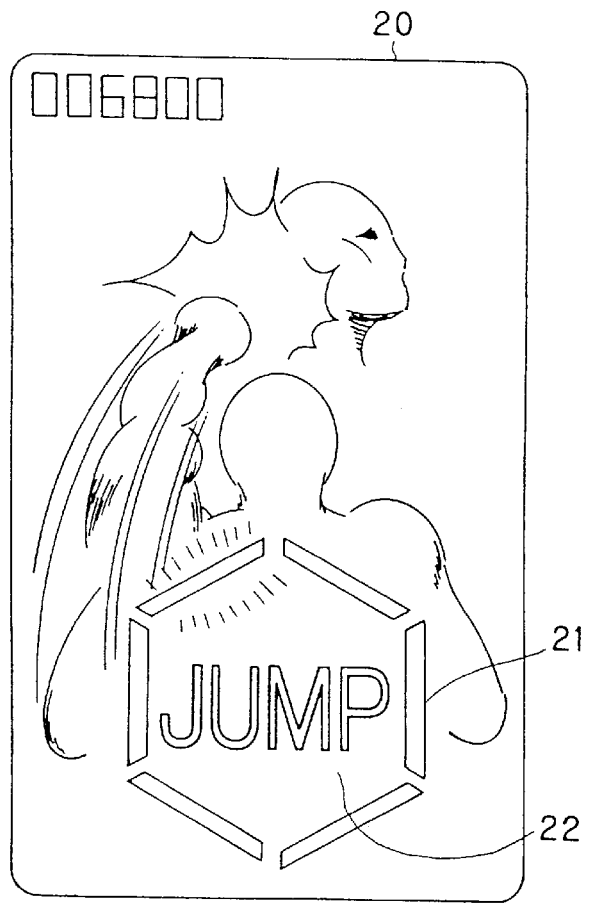
FIGS. 3A and 3B are views explaining motions of the game device according to the first embodiment of the present invention.

It is difficult using the light harp 40 as the operational input means for a human eye to sense what motion of a player supplies operational inputs. In the present embodiment, as shown in FIG. 3A, a plurality of display elements indicative of operational input states of the light harp 40 are set on the display monitor screen of the video display device 20.

That is, on the display monitor screen of the display device 20 there are displayed six (6) segments 21 arranged in a hexagon and display letters "JUMP" 22, which are arranged correspondingly to a layout of the operational mat 44 and the 6 infrared ray sensors 46. When the infrared ray sensors 46 are turned on by operations of a game player, display segments 21 corresponding to the infrared ray sensors 46 change colors or flashes. When a game player jumps, and operational signals are supplied by the operational mat 44, the display letters 22 change colors, or flashes.

Next, the operation of the game device according to the present embodiment will be explained.

When a game is started in response to a start operational signal of the controller 30, operational signals are transmitted from the controller 30 and the light harp 40 to the operational signal memory 12 through the input interface 11 and stored in the memory 12.

The game advancing means 13 advances the game in accordance with the operational signals stored by the operational signal memory 12, based on a program of the game and outputs advancing states of the game to the display control means 14. The display control means 14 controls generation of video game signals to be displayed on the display device 20 in response to advancing states of the game outputted the game advancing means.

When a game player standing on the operational mat 44 of the light harp 40 extends outward his arms or legs, infrared ray sensors 46 corresponding to the extended arms or legs are turned on, and operational signals are inputted. These operational signals are stored in the operational signal memory 12.

The element selecting means 18 selects, based on the operational signals stored in the operational signal memory 12, a display segment 21 corresponding to the turned on infrared ray sensor 46 among the 6 display segments 21 and display letters 22 stored by the element storing means 17. The selected display segment 21 is displayed on the display device 20 by the display control means 14 such that the selected display segments 21 change colors or flash.

Figure 3B:
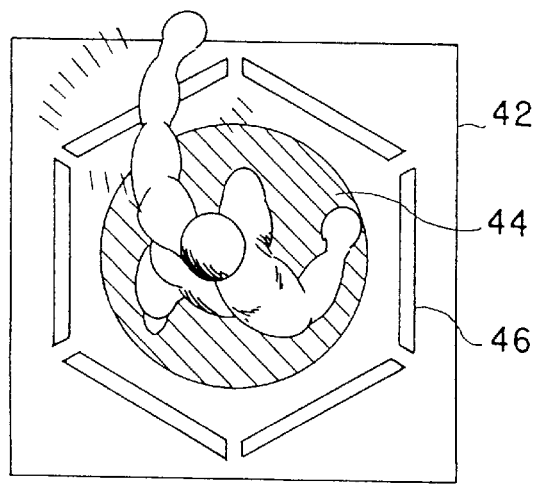

For example, as shown in FIG. 3B, when a game player extends the left arm to block the upper left infrared ray sensor 46 thereabove, a character on the display screen of the display device 20 is punching an opponent with the left arm, and the upper left display segment of the display segments 21 at the lower part of the display screen changes colors or flashes.

When the game player jumps on the operational mat 44, the operational mat 44 outputs operational signals. These operational signals are stored in the operational signal memory 12.

The element selecting means 16 selects display letters 22 stored by the element storing means 17, which correspond to the turned on operational mat 44. The selected display letters 22 are displayed on the display device 20 by the display control means 14 so that the selected display letters 22 change colors or flash.

Thus according to the present embodiment, a game player can enjoy a game while visually confirming his operational states on the display screen. Accordingly the player can accurately understand necessary operations of innovational operational input means, such as the light harp, without confusion. As a result, stresses which may be given to the game player are decreased.

The game device according to a second embodiment of the present invention will be explained with reference to FIGS. 4 to 7B. Common members of the second embodiment with the first embodiment are represented by common reference numerals not to repeat their explanation or to simplify their explanation.

Figure 4:
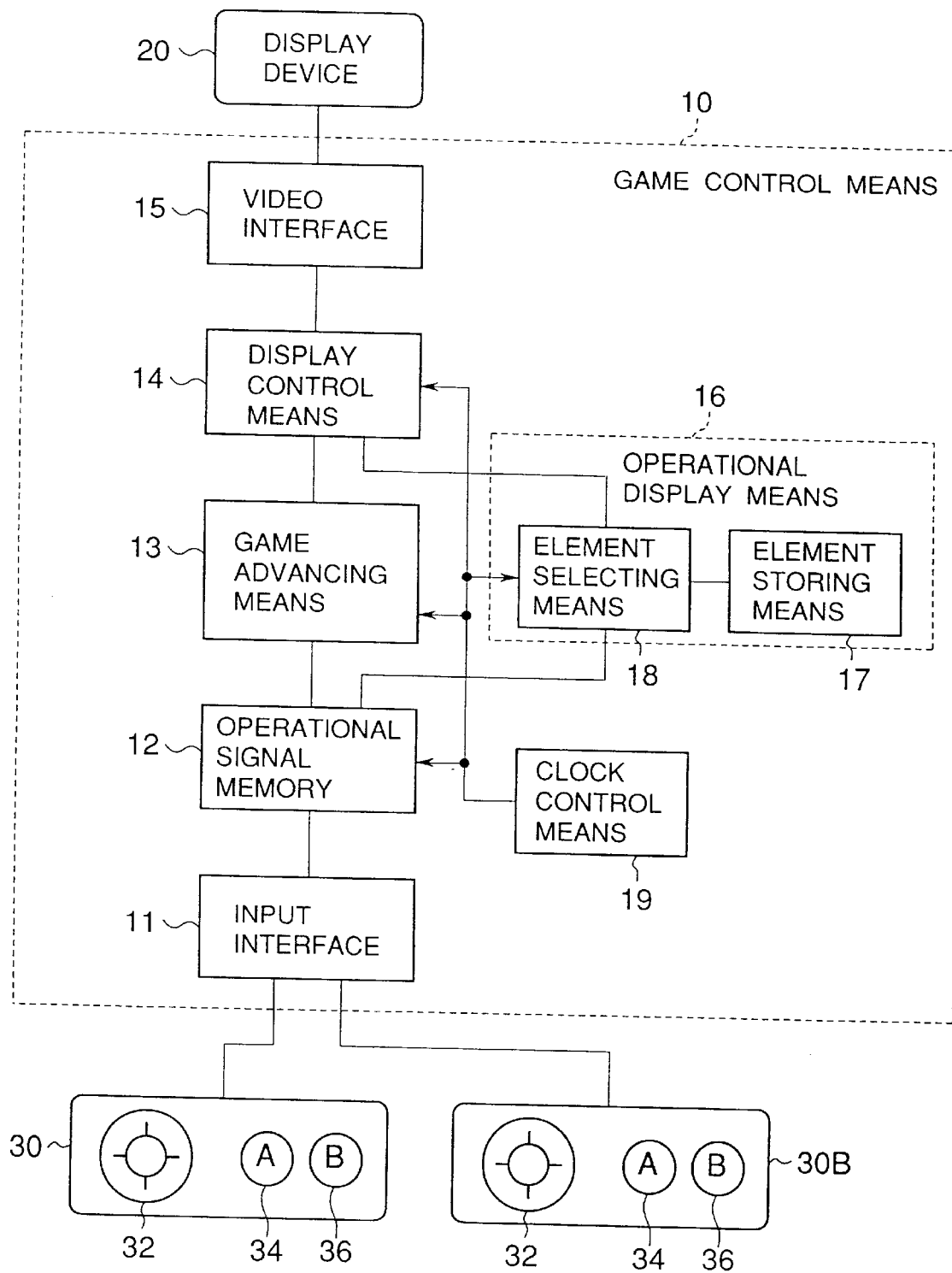
FIG. 4 is a block diagram of the game device according to a second embodiment of the present invention.

As shown in FIG. 4, the game device according to the second embodiment is connected to a display device 20 which displays a game controlled by game control means 10 for controlling a game, and to two controllers 30A, 30B as operational input means This game can be played by two players who mainpulate the controllers 30A and 30B, respectively, and operational signals indicative of operations of a game. Players are supplied to the game control means.

The controllers 30A, 30B each includes a joy stick 32 for inputting operational directions, and an A button 34 and a B button 36 for inputting selecting operations.

Separate groups of display elements may be displayed on the display monitor device 20 correspondingly to the pair of controllers 30A and 30B and selected display elements are selectively displayed on changing colors or flashing in response to the manipulations by the players of the switching elements or buttons. A set of data for displaying the display elements are stored in the element storing means 17 so that layouts and shapes of the display elements simulate controllers 30A and 30B.

Examples of display of the operational display elements will be explained with reference to FIGS. 5 to 7B.

FIG. 5 shows a first display example that one game player plays a game using the controller 30A. A controller display region 23 is provided at a set position at an upper left part of the display screen of the display device 20. There are shown in the controller display region 23 on display device 20 as shown in FIG. 5 a set of elements 23a to 23d disposed in a cross and a pair of elements 23e and 23f a layout of which simulates to an arrangement of the joy stick 32 and the operational buttons 34, 36 of the controller 30A. Elements 23b displayed by changing color indicate that the player has selected the switch elements 32b and 36.

A game player plays a game operating the controller 30A, and he looks at the controller display region 23 at the upper left part of the display screen as required to visually confirm operations he made. Thus game players can readily see relationships between operational states and motions of characters, which enables game players to enjoy games under no stress.

Figure 6:
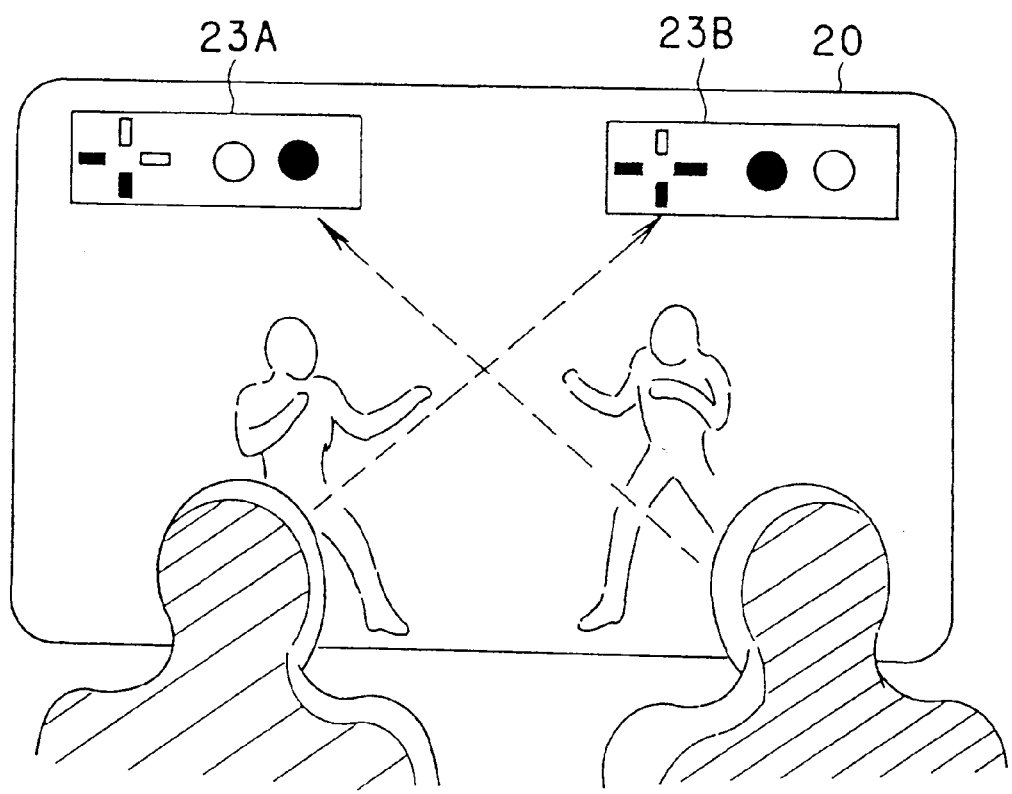
FIG. 6 is an explanatory view of a second display example of the game device according to the second embodiment of the present invention.

FIG. 6 shows a second display example that two game players play a game. Controller display regions 23A, 23B are provided at set positions at upper left and right parts of the display screen of the display device 20. Display positions of the controller display regions 23A, 23B correspond to positions of the controllers 30A, 30B. Elements 23a, 23d and 23f displayed by changing color in the region 23A indicate that the player at the left hand has selected operational direction switches 32a and 32d of joy stick 32 and button B 36 of the controller 30A shown in FIG. 4. Similarly, elements 23a, 23d and 23e displayed by changing color in the region 23B indicate that the player at the right hand has selected operational direction switches 32a and 32d of joy stick 32 and button A 34 of the controller 30B.

One of the game players operates the controller 30A, and the other operates the controller 30B to play a game. The game players look at the controller display regions 23A, 23B of the display screen as required to visually confirm selected operational signals. Especially in a game played by two game players, the players can visually confirm not only their own operational states, but also operational states of the other, which permits the game players to take into account operational states of the other. As a result, sophisticated and very amusing games can be played.

Figure 7A:
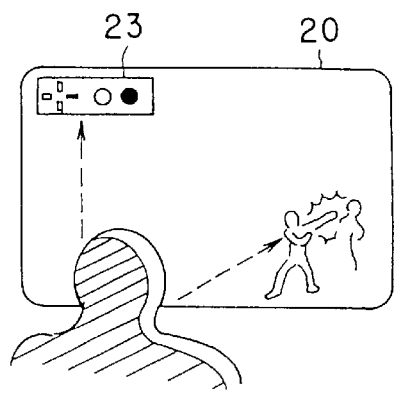
FIGS. 7A and 7B are explanatory views of a third display example of the game device according to the second embodiment of the present invention.
Figure 7B:
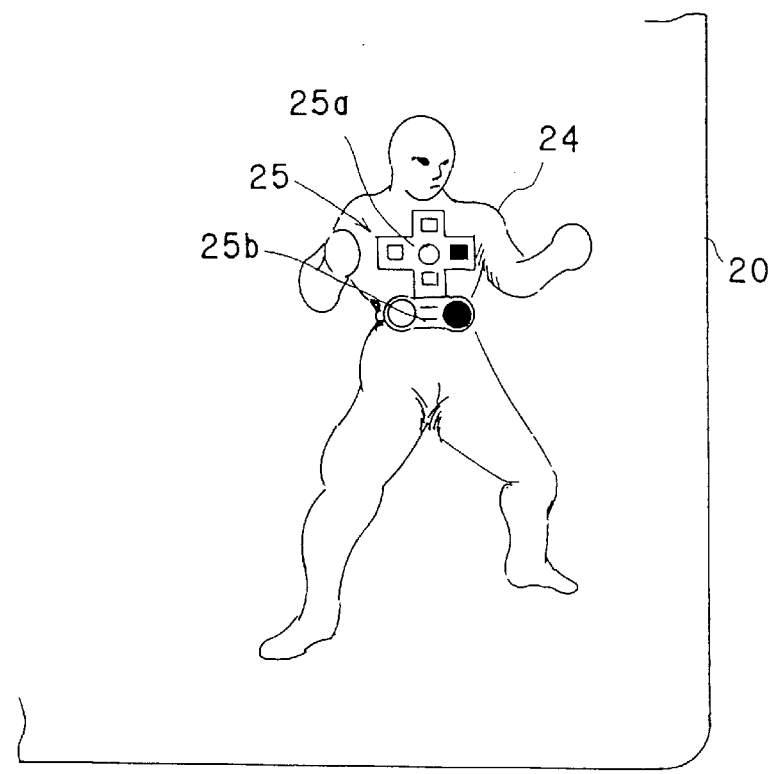

FIGS. 7A and 7B show a third example which is an improvement of the examples of FIGS. 5 and 6. In the examples of FIGS. 5 and 6, as shown in FIG. 7A, display elements to be displayed in response to operational signals of the controllers 30A, 30B are displayed at set positions on the display screen of the display device 20. In this case, game players must pay attention to both motions of characters and displays on the controller display regions 23. As a result the game players can not concentrate and fail to make suitable operations.

As a countermeasure, for a game in which game players operate their own characters to play the game, the controller display regions are arranged to follow the moving characters.

As exemplified in FIG. 7B, the controller display region 25 is superposed on the character 24. The controller display region 25a which contains four display elements 25a1 to 25a4 arranged correspondingly to direction switches 32a to 32d of the joy stick 32 is displayed on an upper part of a shirt worn by the character 24, and the controller display region 25b which contains display elements 25b1 and 25b2 arranged correspondingly to the button A 34 and the button B 36 is displayed on lower parts of the shirt.

The controller display region 25 thus follows the character 24 on the move, whereby game players can pay attention concurrently to the character 24 and the controller display region 25, so that they can enjoy games, confirming without failure input states of operational signals.

The present invention is not limited to the above-described embodiments and covers other modifications and variations.

For example, the above-described embodiments use the controllers and the light harp as operational input means but may use other kind of operational input means. The present invention is effectively applicable especially to innovational operational input means.

The present invention may be applicable to game devices using three or more controllers, etc. as operational input means.

The present invention may be applied to communication game devices in which game deices are mutually connected by communication cables or others, and operational input signals of operational input means of the other game devices may be displayed on the display screen.

The above-described embodiments are applied to game devices used in game centers for explanation but may be applied to domestic game devices.

What is claimed is:

1. A storage device having stored thereon a game program for operating a programmable game device to play a game, the game device being operable under control of an input means having a plurality of switch elements and said game program, said game program stored on said storage device causing the game device to perform the steps of:

displaying a game character on a monitor screen; and additionally displaying a region on the monitor screen which contains a display element corresponding to a switch element of the input means, and emphatically displaying the display element in concert with a movement of the game character so that a game player can see the emphatically displayed display element while the player is playing the game.

2. A storage device having stored thereon a game program for operating a programmable game device to play a game, the game device being operable under control of an input means having a plurality of switch elements and said game program, said game program stored on said storage device causing the game device to perform the steps of:

displaying a pair of game characters on a monitor screen; and displaying on the monitor screen a display element corresponding to a switch element of said input means, and emphatically displaying the display element in concert with a movement of one of the game characters so that a player can see the emphatically displayed display element while the player is playing the game.

3. A storage device of claim 2, wherein said steps further comprise:

producing movement of one of the game characters in response to signals from the input means operated by the player.

4. A storage device of claim 3, wherein said steps further comprise:

displaying a set of display elements so that the display elements are disposed in a layout simulating a plurality of switch elements of an input means; and displaying emphatically selected ones of the display elements corresponding to those of the switch elements which are manipulated by a player.

5. A storage device of claim 2, wherein the movement of one of the game characters is caused by manipulation of the switch elements.

6. A storage device of claim 5, wherein said steps further comprise:

producing movement of one of the game characters in response to signals from the input means operated by a player.

7. A storage device of claim 6, wherein said steps further comprise:

displaying a set of display elements so that the display elements are displayed in a layout simulating a plurality of switch elements of an input means; and displaying emphatically selected ones of the display elements corresponding to those of the switch elements which are manipulated by a player.

* * * * *

US006001017C1

(12) REEXAMINATION CERTIFICATE (4807th)
United States Patent
Okano et al.

(10) Number: US 6,001,017 C1
(45) Certificate Issued: *Jul. 8, 2003

(54) GAME DEVICE FOR DISPLAYING GAME INPUT OPERATORS ON THE DISPLAY

(75) Inventors: Tetsu Okano, Tokyo (JP); Tadashi Kagawa, Tokyo (JP)

(73) Assignee: Sega Enterprises, Ltd., Tokyo (JP)

Reexamination Request:
No. 90/006,105, Sep. 6, 2001

Reexamination Certificate for:
Patent No.: 6,001,017
Issued: Dec. 14, 1999
Appl. No.: 08/778,349
Filed: Jan. 3, 1997

(*) Notice: This patent is subject to a terminal disclaimer.

Related U.S. Application Data

(62) Division of application No. 08/294,811, filed on Aug. 25, 1994, now Pat. No. 5,649,861.

(30) Foreign Application Priority Data

Aug. 25, 1993 (JP) .............................. 5-210219
Aug. 15, 1994 (JP) .............................. 6-191376

(51) Int. Cl.$^7$ ................................................. A63F 9/22
(52) U.S. Cl. .............................. 463/43; 463/31; 463/8; 273/148 B
(58) Field of Search ........................ 463/1, 7–8, 30–31, 463/36–39, 43–44; 273/148 B; 345/156, 161

(56) References Cited

U.S. PATENT DOCUMENTS 4,572,509 A * 2/1986 Sitrick
4,662,635 A * 5/1987 Enokian
4,720,789 A * 1/1988 Hector et al.
4,752,069 A * 6/1988 Okada

FOREIGN PATENT DOCUMENTS

JP 5-44179 6/1993

OTHER PUBLICATIONS

Operation Manual of "JOYMECHA FIGHT" with English Translation, 1993 Nintendo.
Article in Family Computer with English Translation, "Puznik", undated.
TAITO CORP., Super Famicon "Go! Go! With UU Quiz", Operation Manual, 1992 and English language translation.

* cited by examiner

Primary Examiner—Mark Sager

(57) ABSTRACT

A game device comprises operational input means 30, 40 for inputting operational signals supplied by operation of game players, game control means 10 for controlling a game, based on the operational signals of the operational input means 30, 40, and game display means 20 for displaying the game controlled by the game control means 10, the operational signals of the operational input means 40 being displayed by the game display means 20. The game player can confirm game operations they made. As a result, the game player can relatively readily see their game operations they made without stress given to them.

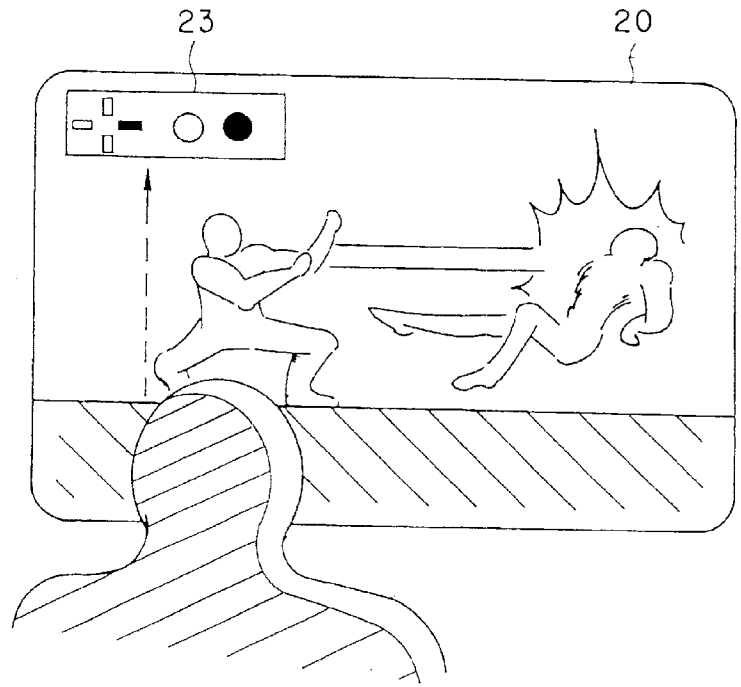

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 5 and 6 are cancelled.

Claims 4 and 7 are determined to be patentable as amended.

New claims 8–11 are added and determined to be patentable.

4. [A storage device of claim 3, wherein said steps further comprise:] *A storage device having stored thereon a game program for operating a programmable game device to play a game, the game device being operable under control of an input means having a plurality of switch elements and said game program, said game program stored on said storage device causing the game device to perform the steps of:*

*displaying a pair of game characters on a monitor screen;*

*displaying on the monitor screen a display element corresponding to a switch element of said input means, and emphatically displaying the display element in concert with a movement of one of the game characters in response to a manipulation of the switch element corresponding to the display element so that a player can see the emphatically displayed display element while the player is playing the game;* producing movement of one of the game characters in response to signals from the input means operated by the player;

displaying a set of display elements so that the display elements are disposed in a layout simulating a plurality of switch elements of an input means; and displaying emphatically selected ones of the display elements corresponding to those of the switch elements which are manipulated by a player.

7. [A storage device of claim 6, wherein said steps further comprise:] *A storage device having stored thereon a game program for operating a programmable game device to play a game, the game device being operable under control of an input means having a plurality of switch elements and said game program, said game program stored on said storage device causing the game device to perform the steps of:*

*displaying a pair of game characters on a monitor screen;*

*displaying on the monitor screen a display element corresponding to a switch element of said input means, and emphatically displaying the display element in concert with a movement of one of the game characters in response to a manipulation of the switch element corresponding to the display element so that a player can see the emphatically displayed display element while the player is playing the game, wherein the movement of one of the game characters is caused by manipulation of the switch elements;* producing movement of one of the game characters in response to signals from the input means operated by a player;

displaying a set of display elements so that the display elements are displayed in a layout simulating a plurality of switch elements of an input means; and display emphatically selected ones of the display elements corresponding to those of the switch elements which are manipulated by a player.

8. *A storage device having stored thereon a game program for operating a programmable game device to play a game, the game device being operable under control of an input means having a plurality of switch elements and said game program, said game program stored on said storage device causing the game device to perform the steps of:*

*displaying a game character on a monitor screen;*

*displaying on the monitor screen a set of display elements corresponding to the switch elements of the input means, the set of display elements being displayed in a layout simulating a layout of the switch elements on the input means;*

*inputting operational signals from the input means in response to manipulation of a switch element by a player of the game; and*

*changing the color of the display element corresponding to the manipulated switch element in concert with a movement of the game character in response to the manipulation of the switch element by the player.*

9. *A storage device having stored thereon a game program for operating a programmable game device to play a game, the game device being operable under control of an input means having a plurality of switch elements and said game program, said game program stored on said storage device causing the game device to perform the steps of:*

*displaying a game character on a monitor screen;*

*displaying on the monitor screen a set of display elements corresponding to the switch elements of the input means, the set of display elements being displayed in a layout simulating a layout of the switch elements on the input means;*

*inputting operational signals from the input means in response to manipulation of a switch element by a player of the game; and*

*flashing the display element corresponding to the manipulated switch element in concert with a movement of the game character in response to the manipulation of the switch element by the player.*

10. *A storage device having stored thereon a game program for operating a programmable game device to play a game, the game device being operable under control of an input means having a plurality of switch elements and said game program, said game program stored on said storage device causing the game device to perform the steps of:*

*displaying a game character on a monitor screen;*

*displaying on the monitor screen a set of display elements corresponding to the switch elements of the input means, the set of display elements being displayed in a layout simulating a layout of the switch elements on the input means;*

*inputting operational signals from the input means in response to manipulation of at least one switch element by a player of the game; and*

*changing the color of the at least one display element corresponding to the at least one manipulated switch element in concert with a movement of the game character in response to the manipulation of the at least one switch element by the player.*

11. *A storage device having stored thereon a game program for operating a programmable game device to play a* game, the game device being operable under control of an input means having a plurality of switch elements and said game program, said game program stored on said storage device causing the game device to perform the steps of:

displaying a game character on a monitor screen;

displaying on the monitor screen a set of display elements corresponding to the switch elements of the input means, the set of display elements being displayed in a layout simulating a layout of the switch elements on the input means;

inputting operational signals from the input means in response to manipulation of at least one switch element by a player of the game; and flashing the at least one display element corresponding to the at least one manipulated switch element in concert with a movement of the game character in response to the manipulation of the at least one switch element by the player.

* * * * *